(12) United States Patent
Angelucci, III

(10) Patent No.: US 10,352,348 B2
(45) Date of Patent: Jul. 16, 2019

(54) FASTENING SYSTEMS

(71) Applicant: Sikorsky Aircraft Corporation, Stratford, CT (US)

(72) Inventor: Ralph John Angelucci, III, Lexington, KY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 132 days.

(21) Appl. No.: 15/169,058

(22) Filed: May 31, 2016

(65) Prior Publication Data
US 2017/0343035 A1 Nov. 30, 2017

(51) Int. Cl.
*F16B 39/10* (2006.01)
*F16B 33/00* (2006.01)

(52) U.S. Cl.
CPC ............ *F16B 39/10* (2013.01); *F16B 33/002* (2013.01)

(58) Field of Classification Search
CPC ..................................................... F16B 39/10
USPC ................................ 411/109, 119, 120, 166
See application file for complete search history.

(56) References Cited

U.S. PATENT DOCUMENTS

| | | | | |
|---|---|---|---|---|
| 1,016,146 A | * | 1/1912 | Hawes | F16B 39/10 411/191 |
| 1,145,256 A | * | 7/1915 | Mochow | F16B 39/02 220/328 |
| 4,534,101 A | * | 8/1985 | Rosan, Jr. | F16B 39/10 29/258 |
| 4,938,644 A | * | 7/1990 | Runels | F16B 39/10 411/120 |
| 5,232,323 A | * | 8/1993 | Baehre | F16B 33/002 411/109 |
| 7,922,433 B2 | * | 4/2011 | Ricciardo | F16B 39/10 411/119 |
| 9,169,864 B2 | | 10/2015 | Colombo et al. | |
| 9,188,149 B2 | * | 11/2015 | Bennett | F16B 41/005 |
| 9,599,142 B2 | * | 3/2017 | Banks | F16B 39/108 |

* cited by examiner

*Primary Examiner* — Flemming Saether
(74) *Attorney, Agent, or Firm* — Cantor Colburn LLP

(57) ABSTRACT

A fastening system includes an anchoring structure defining a threaded bore. A stud or insert is threaded into the threaded bore. A lockring is fixed to the stud or insert to prevent relative rotation of the stud or insert and lockring. The lockring includes a key extending radially outward from the stud or insert. The key of the lockring is seated in a keyway defined in the anchoring structure to prevent relative rotation of the stud or insert and the anchoring structure. There can be multiple keys extending radially from the lockring and multiple corresponding keyway defined in the anchoring structure, wherein each key is engaged in a corresponding keyway.

7 Claims, 2 Drawing Sheets

FASTENING SYSTEMS

BACKGROUND OF THE INVENTION

1. Field of the Invention

The present disclosure relates to fastening apparatus, and more particularly to locking fasteners such as used in preventing rotation of threaded fasteners.

2. Description of Related Art

Threaded fastening elements, such as threaded studs and inserts, are used to connect components together. It is important in some applications to ensure that the threaded fastening element does not rotate once placed in position within one of the components of an assembly. In such applications, a locking system can be used that can prevent the threaded fastening element rotating relative to a threaded hole in which it is received.

One common approach uses a lockring that is serrated on its outer diameter and on its inner diameter. The inner diameter serrations interface with a threaded stud, and the serrations on the outer diameter gouge into the parent material into which the stud is threaded. While this prevents rotation of the stud in the parent material, it can create life limiting locations or stress risers in the parent material. For example, in aerospace applications such as when assembling a magnesium transmission housing, stress risers can arise from gouging the magnesium with the outer diameter serrations of the lockring. In this example, there can also be unknowns about the orientation of the serrations at assembly, and whether transverse loads are passed through the lockrings from operating loads.

Such conventional methods and systems have generally been considered satisfactory for their intended purpose. However, there is still a need in the art for improved fastening apparatus. The present disclosure provides a solution for this need.

SUMMARY OF THE INVENTION

A fastening system includes an anchoring structure defining a threaded bore. A stud or insert is threaded into the threaded bore. A lockring is fixed to the stud or insert to prevent relative rotation of the stud or insert and lockring. The lockring includes a key extending radially outward from the stud or insert. The key of the lockring is seated in a keyway defined in the anchoring structure to prevent relative rotation between the stud or insert and the anchoring structure. There can be multiple keys extending radially from the lockring and multiple corresponding keyways defined in the anchoring structure, wherein each key is engaged in a corresponding keyway.

The system can include a fastened structure, wherein the stud or bolt extends through a bore in the fastened structure. A nut or bolt can be threaded to the stud or insert on a side of the fastened structure opposite the anchoring structure to secure the fastened structure to the anchoring structure.

The lockring can be seated in a counterbore defined in the anchoring structure about an opening into the threaded bore. The keyway can be contiguous with the counterbore, and can be filleted to conform smoothly to the counterbore. There can be play within the keyway between the keyway and the key. Serrations can be defined about the stud or insert, wherein an inner diameter of the lockring defines serrations. The serrations of the lockring can engage the serrations of the stud or insert to prevent relative rotation between the stud or insert and the lockring.

The keyway can optionally be potted in with an epoxy or other material securing the key within the keyway. This can prevent the lockring from shifting or falling out during assembly and prevent direct contact between the lockring and anchoring structure. Once all the components are assembled, the lockring can be positively retained by the fastened structure and anchoring structure. The ratio of the diameter of the lockring to the width, length, and thickness of the key of can be between 1 and 100.

A method for fastening includes forming a keyway in an anchoring structure, threading a stud or insert into a threaded bore of the anchoring structure, and securing the stud or insert against rotation relative to the bore with a lockring engaged to the stud or insert. The lockring includes a key extending radially from the stud or insert, wherein the key is seated in the keyway of the anchoring structure.

Forming the keyway can include forming a counterbore about the threaded bore of the anchoring structure, and wherein securing the stud or insert can include seating the lockring in the counterbore. Forming the keyway can include forming the keyway contiguous with the counterbore. Forming the keyway can include forming the keyway to be filleted to conform smoothly to the counterbore. Forming the keyway can include machining the keyway and counterbore in the anchoring structure with an end mill.

Securing the stud or insert can include engaging the key in the keyway wherein there is play between the key and the keyway. The method can optionally include potting the counterbore with an epoxy material. Securing the stud or insert against rotation relative to the bore with a lockring engaged to the stud or insert can include engaging serrations on an inner diameter of the lockring with corresponding serrations on the stud or insert.

The method can include extending the stud or bolt through a bore in a fastened structure, and securing the fastened structure to the anchoring structure by threading a nut or bolt to the stud or insert on a side of the fastened structure opposite the anchoring structure. Given the lockring prevents rotation of the stud or insert relative to the anchoring structure, the corresponding nut or bolt can be tightened and loosened without turning the stud or insert. The nut or bolt and fastened structure can be removed prior to removal of the lockring during disassembly.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
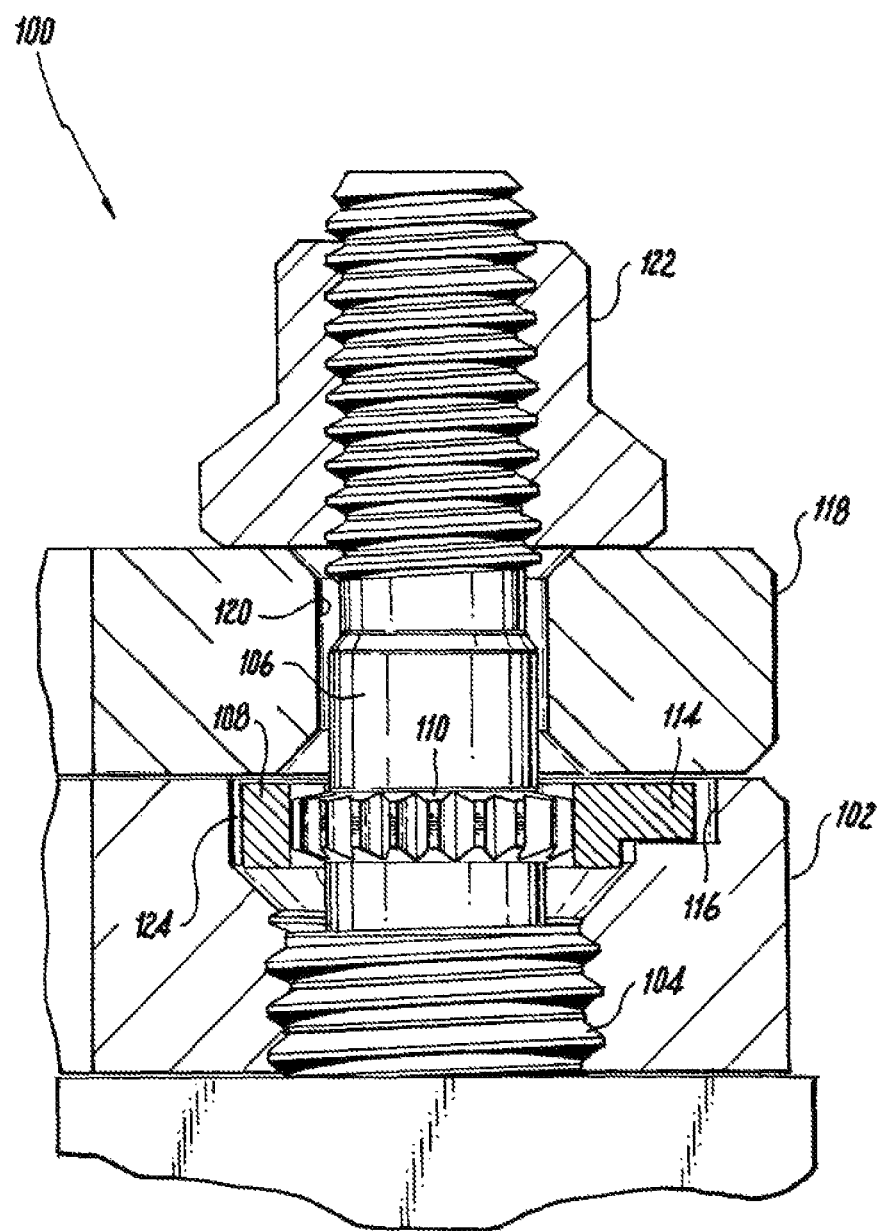
FIG. 1 is a cross-sectional elevation view of an exemplary embodiment of a fastening system constructed in accordance with the present disclosure, showing the lockring engaged between the stud and the counterbore of the anchoring body.

Reference will now be made to the drawings wherein like reference numerals identify similar structural features or aspects of the subject disclosure. For purposes of explanation and illustration, and not limitation, a partial view of an exemplary embodiment of a fastening system in accordance with the disclosure is shown in FIG. 1 and is designated generally by reference character 100. Other embodiments of fastening systems in accordance with the disclosure, or aspects thereof, are provided in FIGS. 2-3, as will be described. The systems and methods described herein can be used to fasten components, such as when joining aircraft components or the like.

The fastener locking system is very similar for studs and inserts. For simplification, the present disclosure will focus the discussion and figures on the application for studs. However, those skilled in the art will readily appreciate that the locking system and process can be applied to any threaded fastener (e.g., both studs and inserts).

Figure 2:
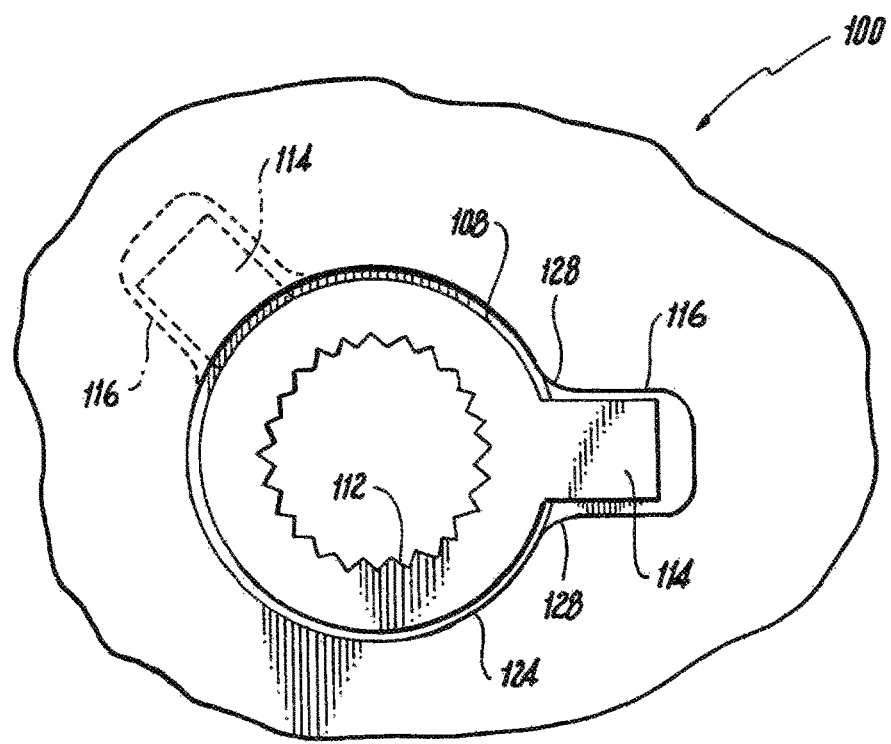
FIG. 2 is a schematic plan view of the lockring and counterbore of FIG. 1, showing the key of the lockring engaged with play within the keyway of the counterbore.

Fastening system 100 includes an anchoring structure 102 defining a threaded bore 104. A stud 106 is threaded into the threaded bore 104. A lockring 108 is fixed to the stud 106 to prevent relative rotation of the stud 106 and lockring 108. Serrations 110 are defined about the stud 106, and an inner diameter of the lock ring 108 defines corresponding serrations 112, as shown in FIG. 2. The serrations 112 of the lockring 108 engage the serrations 110 of the stud 106 to prevent relative rotation between the stud 106 and the lockring 108.

The lockring 108 includes a key 114 extending radially outward from the lockring 108 in a direction radially outward from the stud 106. The key 114 of the lockring 108 is seated in a keyway 116 defined in the anchoring structure 102 to prevent relative rotation of the stud 106 and the anchoring structure 102. While shown and described herein in the exemplary context of having a single key 114 and keyway 116, those skilled in the art will readily appreciate that there can be multiple keys 114 extending radially from the lockring and multiple corresponding keyways 116 defined in the anchoring structure 102, wherein each key 114 is engaged in a corresponding keyway 116, e.g., as indicated with dashed lines in FIG. 2.

Figure 3:
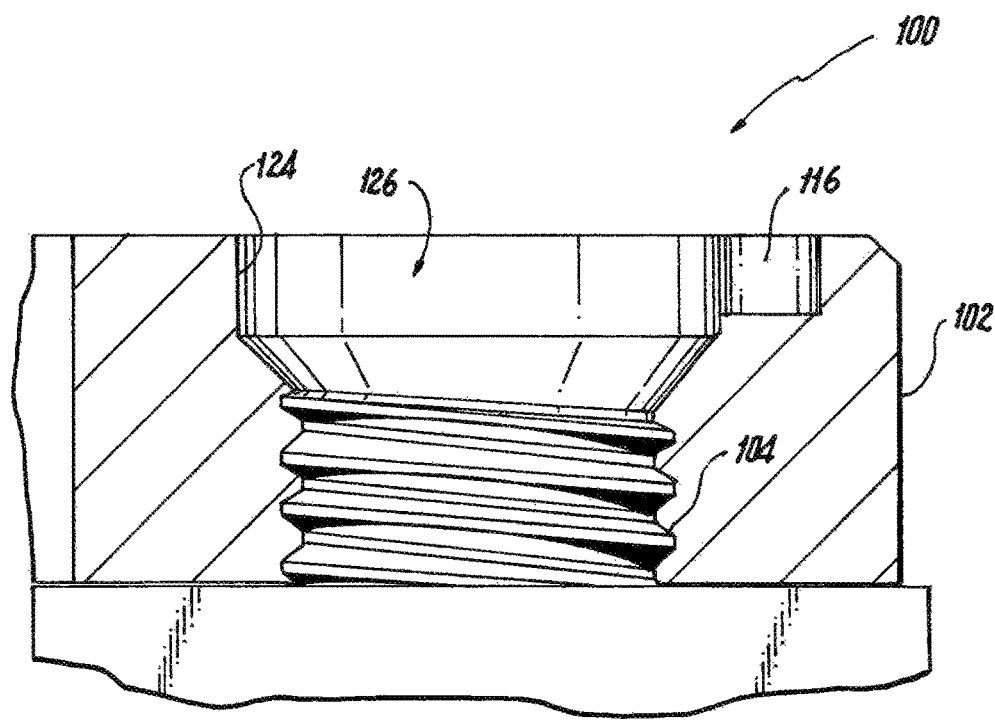
FIG. 3 is a schematic cross-sectional view of a portion of the system of FIG. 1, showing the counterbore positioned around the threaded bore of the anchoring body.

The lockring 108 is seated in a counterbore 124 defined in the anchoring structure 102 about an opening 126, indicated in FIG. 3, into the threaded bore 104. The keyway 116 is contiguous with the counterbore 124, and is filleted, as indicated in FIG. 2 with fillets 128, to conform smoothly to the counterbore 124. The ratio of the diameter of the lockring 108 to the width, length, and thickness of the key 114 can be between 1 and 100.

As shown in FIG. 2, there is play within the keyway 116 between the keyway 116 and the key 114 of the lockring 108. The keyway 116 can optionally be potted in with an epoxy material securing the key 114 within the keyway 116. The play allows for removal of lockring 108, e.g., by removing the potting epoxy if any, and using pliers or the like to grip key 114 within keyway 116 for removal of lockring 108 from stud 106.

The system 100 can include a fastened structure 118, wherein the stud 106 extends through a bore 120 in the fastened structure 118. A nut 122 can be threaded to the stud 106 on a side of the fastened structure 118 opposite the anchoring structure 102 to secure the fastened structure 118 to the anchoring structure 102.

A method for fastening includes forming a keyway, e.g., keyway 116, in an anchoring structure, e.g., anchoring structure 102, threading a stud, e.g., stud 106, into a threaded bore, e.g., threaded bore 104, of the anchoring structure, and securing the stud against rotation relative to the bore with a lockring, e.g., lockring 108, engaged to the stud. The lockring includes a key, e.g., key 114 extending radially from the lockring in a direction radially outward from the stud, wherein the key is seated in the keyway of the anchoring structure.

Forming the keyway can include forming a counterbore, e.g., counterbore 124 about the threaded bore of the anchoring structure, and wherein securing the stud includes seating the lockring in the counterbore. Forming the keyway can include forming the keyway contiguous with the counterbore. Forming the keyway can include forming the keyway to be filleted to conform smoothly to the counterbore, e.g., as shown in FIG. 2. Forming the keyway can include machining the keyway and counterbore in the anchoring structure with an end mill or any other suitable process. Those skilled in the art will readily appreciate that while bore 104 is referred to herein as a threaded bore, the threads of the threaded bore 104 can be tapped before or after forming the counterbore and keyway.

Securing the stud against rotation relative to the bore with a lockring engaged to the stud can include engaging serrations, e.g., serrations 112, on an inner diameter of the lockring with corresponding serrations, e.g., serrations 110, on the stud. Securing the stud can include engaging the key in the keyway wherein there is play between the key and the keyway. The method can optionally include potting the counterbore with an epoxy material.

The method can include extending the stud through a bore in a fastened structure, e.g., bore 120 of fastened structure 118, and securing the fastened structure to the anchoring structure by threading a nut, e.g., nut 122, to the stud on a side of the fastened structure opposite the anchoring structure. For disassembly, the nut and anchored structure can be removed. Then as explained above, the stud can be removed from the anchoring structure by removing the potting epoxy, if any, and using the play between the key and keyway to grasp the key, e.g., with pliers or the like, to allow lockring to be pried free of stud. After removal of the lockring, the stud is free to rotate to be unthreaded from the anchoring structure.

Since there are no serrations on the outer diameter of lockring 108 gouging into the parent material of anchoring structure 102, the typical stress risers, stress concentrations, and crack initiation sites are reduced or eliminated. Additionally, the parent material of anchoring structure 102 is undamaged and can readily accept a new stud 106 and lockring 108. Any stress riser or the like resulting from the formation of keyway 116 in anchoring structure 102 can be controlled by designing the location of keyway 116 to be in a suitable, low stress portion of anchoring structure 102. This also allows for design control of whether or not transverse loads are passed through lockring 108.

The methods and systems of the present disclosure, as described above and shown in the drawings, provide for fastening systems with superior properties including reduced stress risers and improved control of location of stress risers, as well as requiring fewer tools for assembly and disassembly. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fastening system to fasten multiple components, the fastening system comprising:
   an anchoring structure defining a threaded bore and having a keyway formed in a first surface;
   a threaded fastener having a first threaded portion coupled to the threaded bore, a second threaded portion separated from the first threaded portion, and a plurality of first serrations formed about the threaded fastener at a position between the first threaded portion and the second threaded portion, each of the plurality of first serrations including a first surface and a second surface extending between an inner diameter and an outer diameter of the plurality of serrations;
   a lockring including a plurality of second serrations, each of the plurality of second serrations being complementary to and configured to engage a corresponding first serration of the plurality of first serrations to prevent relative rotation of the threaded fastener and lockring, wherein the lockring includes a key extending radially outward from the lockring such that when the key of the lockring is seated in the keyway, the key prevents relative rotation of the threaded fastener and the anchoring structure, wherein the keyway and the key are sized such that a clearance exists between the key and the keyway there is play between the key and the keyway;
   an epoxy material removably potted within the keyway for securing the key within the keyway;
   a fastened structure positioned adjacent the first surface of the anchoring structure, the fastened structure including a through bore within which a second portion of the threaded fastener is received; and
   a nut positioned adjacent the fastened structure opposite the anchoring structure, the nut being coupled to the second threaded portion of the threaded fastener to secure the fastened structure to the anchoring structure.

2. A system as recited in claim 1, wherein the lockring is seated in a counterbore defined in the anchoring structure about an opening into the threaded bore.

3. A system as recited in claim 2, wherein the keyway is contiguous with the counterbore.

4. A system as recited in claim 3, wherein the keyway is filleted to conform smoothly to the counterbore.

5. A system as recited in claim 1, wherein there are serrations wherein an inner diameter of the lock ring include the plurality of second serrations.

6. A system as recited in claim 1, wherein there is a ratio of diameter of the lockring to width, length, and thickness of the key of between 1 and 100.

7. A system as recited in claim 1, wherein the key is a first key, wherein the keyway is a first keyway, and further comprising at least one additional key extending radially from the lockring and at least one additional keyway defined in the anchoring structure, wherein each key is engaged in a corresponding keyway.

* * * * *